(12) United States Patent
Turitsyn et al.

(10) Patent No.: US 7,860,403 B2
(45) Date of Patent: Dec. 28, 2010

(54) DATA FORMAT FOR HIGH BIT RATE WDM TRANSMISSION

(75) Inventors: Sergei Turitsyn, Birmingham (GB); Mickail Fedoruk, Novosibirsk (RU); Elena G Shapiro, Novosibirsk (RU)

(73) Assignee: Xtera Communications Ltd., Harold Wood, Romford, Essex (GB)

( * ) Notice: Subject to any disclaimer, the term of this patent is extended or adjusted under 35 U.S.C. 154(b) by 536 days.

(21) Appl. No.: 10/553,338

(22) PCT Filed: Apr. 16, 2004

(86) PCT No.: PCT/GB2004/001668

§ 371 (c)(1),
(2), (4) Date: Oct. 14, 2005

(87) PCT Pub. No.: WO2004/095752

PCT Pub. Date: Nov. 4, 2004

(65) Prior Publication Data

US 2006/0239694 A1    Oct. 26, 2006

(30) Foreign Application Priority Data

Apr. 17, 2003 (GB) ............................... 03089951.3

(51) Int. Cl.
*H04B 10/00* (2006.01)
(52) U.S. Cl. ........................ 398/201; 398/182
(58) Field of Classification Search .............. 398/149, 398/75, 98, 182–201
See application file for complete search history.

(56) References Cited

U.S. PATENT DOCUMENTS

| | | | | |
|---|---|---|---|---|
| 4,928,316 A * | 5/1990 | Heritage et al. | ............. | 398/199 |
| 5,557,441 A * | 9/1996 | Mollenauer | ................ | 398/146 |
| 5,631,758 A * | 5/1997 | Knox et al. | .................. | 398/75 |
| 5,777,773 A * | 7/1998 | Epworth et al. | ............. | 398/185 |
| 6,388,782 B1 * | 5/2002 | Stephens et al. | .............. | 398/79 |
| 6,654,152 B2 * | 11/2003 | Jacobowitz et al. | ......... | 359/240 |
| 6,674,936 B2 * | 1/2004 | Jacobowitz et al. | ........... | 385/24 |
| 6,724,786 B2 * | 4/2004 | Jacobowitz et al. | ........... | 372/20 |
| 7,031,619 B2 * | 4/2006 | DeCusatis et al. | ........... | 398/196 |
| 7,062,164 B2 * | 6/2006 | Ames et al. | ................... | 398/25 |
| 7,116,917 B2 * | 10/2006 | Miyamoto et al. | .......... | 398/185 |
| 7,366,425 B2 * | 4/2008 | Mamyshev et al. | ........ | 398/188 |
| 2001/0019436 A1 * | 9/2001 | Nakajima et al. | ........... | 359/110 |

(Continued)

FOREIGN PATENT DOCUMENTS

EP        0729057 A2      2/1996

(Continued)

*Primary Examiner*—Agustin Bello
(74) *Attorney, Agent, or Firm*—Workman Nydegger

(57) ABSTRACT

The invention includes a method for optically encoding data for transmission over a wavelength division multiplexed optical communications system comprising the steps of: generating a periodic series of optical pulses defining a series of time slots, wherein one pulse appears in each time slot; filtering the pulses to produce carrier pulses extending over more than one time slot; and modulating the pulses with data for transmission. Preferably, the filter gives rise to the pulses having a temporal profile with a minimum in the centre of each of the time slots adjacent to the time slot for that pulse. The resulting data format allows for greater spectral efficiency in a WDM optical transmission system as compared with conventional RZ and NRZ data formats.

20 Claims, 4 Drawing Sheets

U.S. PATENT DOCUMENTS

| | | |
|---|---|---|
| 2002/0154357 A1* | 10/2002 | Ozveren et al. ............. 359/124 |
| 2002/0176457 A1* | 11/2002 | DeCusatis et al. ............ 372/26 |
| 2002/0186435 A1 | 12/2002 | Shpantzer et al. |
| 2002/0191268 A1* | 12/2002 | Seeser et al. ................ 359/260 |
| 2003/0002138 A1* | 1/2003 | DeCusatis et al. ........... 359/334 |
| 2003/0030875 A1* | 2/2003 | Barczyk ..................... 359/182 |
| 2003/0165341 A1* | 9/2003 | Bulow ........................ 398/75 |

FOREIGN PATENT DOCUMENTS

| WO | WO 01/50663 | 7/2001 |
|---|---|---|

* cited by examiner

DATA FORMAT FOR HIGH BIT RATE WDM TRANSMISSION

FIELD OF THE INVENTION

The present invention relates to optical data transmission in a wavelength division multiplex (WDM) scheme, and in particular to a spectrally efficient data format.

BACKGROUND TO THE INVENTION

Transmission of optical data at high bit rates, e.g. 40 Gb/s, in general benefits from the use of narrow pulse width optical data. Narrower temporal pulse width means a broader frequency spectrum for each data pulse, which limits the number of channels that can be used in a WDM scheme. For example, a Return to Zero (RZ) pulse at 10 Gb/s will have a spectral width of about 40 Ghz whilst an RZ pulse at 40 Gb/s will have a spectral width of about 160 GHz.

WDM schemes increase fibre capacity by transmitting multiple channels, each at different wavelengths, over a single fibre. However, optically amplified systems have a limited useable bandwidth. Using a higher bit rate increases the bandwidth of each channel and therefore reduces the number of channels which can be used. The result is that a bit rate of 40 Gb/s offers no advantage over a lower bit rate of say 10 Gb/s because the maximum amount of information that can be transmitted in a given time over an optical fibre link at each rate is approximately the same.

There are a number of schemes which have been developed to improve spectral efficiency at high bit rates, such as using vestigial sideband (VSB) filtering and polarisation division multiplexing, all involving further processing of the optical data signals. The aim of the present invention is to provide a data format, and a transmitter and method for producing the same, which provides improved spectral efficiency over traditional data formats.

SUMMARY OF THE INVENTION

According to the present invention, a method of optically encoding data for transmission over a wavelength division multiplexed optical communications system comprises the steps of:

generating a periodic series of optical pulses defining a series of time slots, wherein one pulse appears in each time slot;

filtering the pulses to produce carrier pulses extending over more than one time slot; and modulating the pulses with data for transmission.

The pulses preferably extend over more than one time slot in such a way that the pulses are resonantly spaced with respect to neighbouring pulses. In other words, the filter bandwidth is selected so that the oscillating tails of the pulses have minima in adjacent time slots. Preferably, the filter gives rise to the pulses having a temporal profile with a minimum substantially in the centre of each of the time slots adjacent to the time slot for that pulse. The decision point for each bit is typically in the centre of the respective time slot and so the effect on the neighbouring bit should be minimised at that point. Preferably, the filtered carrier pulses have a substantially flat top spectral profile. Preferably, the filter is detuned to optimise transmission performance.

The step of modulating the pulses with data can be performed either before or after the filtering step, but is preferably performed before the filtering step.

The data resulting from the method of the present invention has a relatively small bandwidth. The effect of overlap between neighbouring bits is mitigated by resonantly positioning the minima of each pulse in the centre of adjacent pulses.

According to a second aspect of the present invention, a transmitter for producing an optical data signal for transmission over a wavelength division multiplexed optical communication system comprises:

means for producing a periodic series of optical pulses defining a series of time slots, wherein one pulse appears in each time slot;

a filter having a spectral profile giving rise to pulses with a temporal profile extending over more than one time slot; and modulating means for modulating the pulses with data for transmission.

Preferably, the filter has a substantially flat top spectral profile. Preferably, the filter is detuned to optimise transmission performance.

Preferably, the transmitter includes control means for optically detuning the optical filter in order to optimise transmission performance.

BRIEF DESCRIPTION OF THE DRAWINGS

Examples of the present invention will now be described in detail with reference to the accompanying drawings, in which.

DETAILED DESCRIPTION

Figure 1:
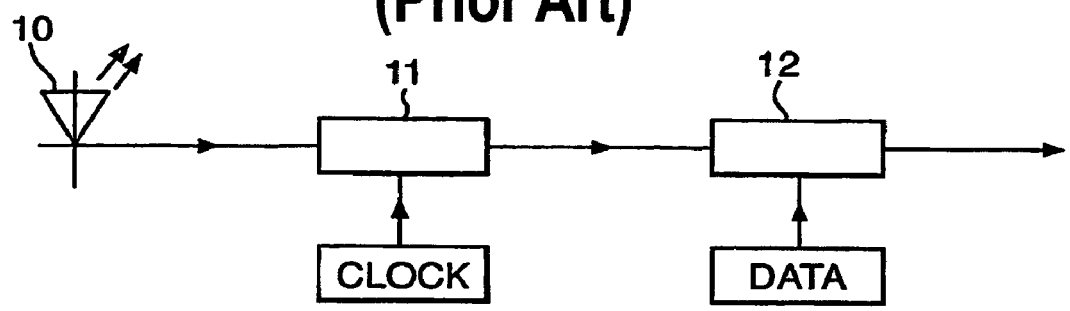
FIG. 1 is a schematic illustration of an optical transmitter architecture in accordance with the prior art.

FIG. 1 is a schematic illustration of a basic architecture for an optical transmitter in accordance with the prior art. A coherent light source 10, such as a CW laser, produces an optical beam which is first modulated with an electrical clock signal using a first modulator 11 and is subsequently modulated with a data signal using a second modulator 12. The first and second modulators could be Mach Zehnder (MZ) modulators or another type of electro-optic modulator.

The first modulator 11 provides a series of pulses at a particular bit rate in accordance with the clock signal. The second modulator 12 puts data onto the series of pulses by modulating the it with NRZ electrical data. The resulting output is data encoded as an RZ optical signal. An RZ data format is generally preferred to NRZ data format for long haul optical transmission as it gives rise to better transmission performance.

In WDM transmission schemes, each channel must be spaced from adjacent channels in the frequency domain in order to avoid inter-channel crosstalk and other corrupting mechanisms. Each RZ pulse in the data stream of a channel has an associated spectral width. The shorter the pulse i.e. the higher the bit rate, the broader the frequency of the pulse. Conversely, the narrower the spectrum of each pulse the broader the pulse in the time domain, which could potentially lead to overlapping between neighbouring pulses resulting in patterning effects. There is always a balance to be struck between bandwidth and bit rate.

Figure 2:
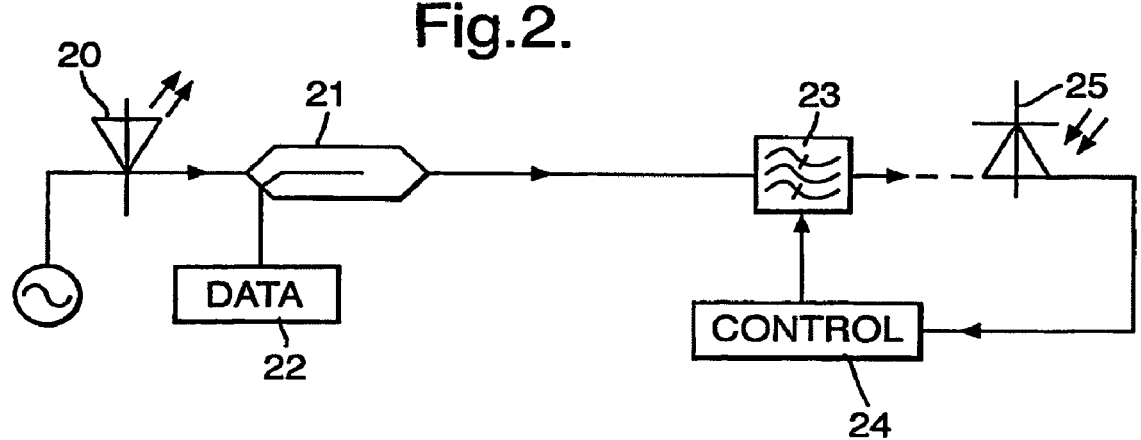
FIG. 2 illustrates an example of a transmitter architecture in accordance with the present invention.

FIG. 2 illustrates a transmitter in accordance with the present invention which provides a means for generating optical signals with a narrow spectral width at a particular bit rate whilst avoiding the strong patterning effects that would be experienced using conventional RZ data of the same spectral width and bit rate.

In the transmitter in FIG. 2, a pulsed laser light source is used, for example an active mode locked laser 20. An active mode locked laser can be made to produce a series of narrow pulses at a particular bit rate. 40 Ghz active mode locked lasers are available from a number of manufacturers, for example Pritel Inc of Naperville, Ill. USA produce a UOC Series of Ultrafast Optical Clocks suitable for use in the present invention.

The pulsed light from the light source is modulated with data using an electro-optic modulator 21. Electrical NRZ data is written onto the pulsed light stream using a Mach Zehnder modulator driven by an electrical NRZ data source 22 operating at the same bit rate as the light source 20.

The pulses from the light source are extremely narrow relative to the bit rate and have a broad spectral profile. However, the transmitter shown in FIG. 2 includes a filter element 23 which alters the spectral profile of the pulses. In order to allow as many channels to be packed into the available bandwidth, the spectral width of the pulses must be reduced and preferably has a sharp cut-off, i.e. a substantially flat top spectral profile with sharp decay outside the desired frequency band.

FIG. 3 illustrates the spectrum of a pulse before and after filtering. FIG. 3a shows the spectrum of a pulse prior to filtering. The pulses illustrated are 1.7 ps in length and have a frequency content extending over several hundred Ghz. FIG. 3b shows the profile of the optical filter shown in FIG. 2. The filter is a super-Gaussian $6^{th}$ order bandpass filter with a bandwidth of 40 Ghz. Also shown is the ideal filter profile which is a rectangular profile.

Figure 3A:
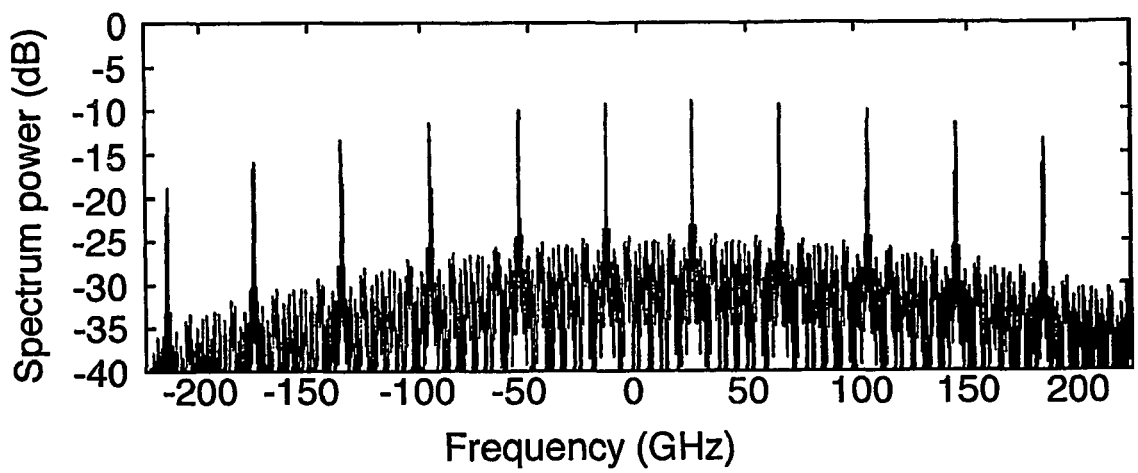
FIG. 3 illustrates the spectrum of a signal generated in accordance with the present invention.
Figure 3B:
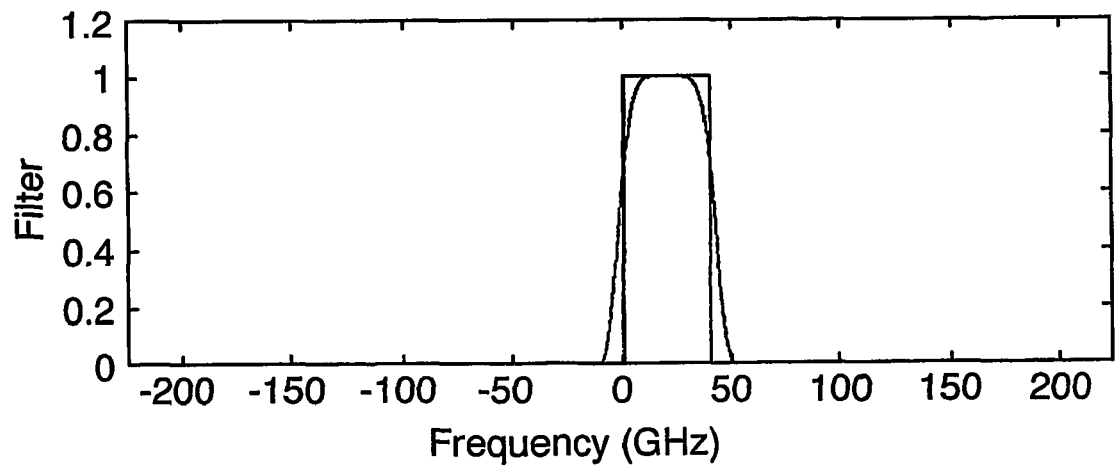
Figure 3C:
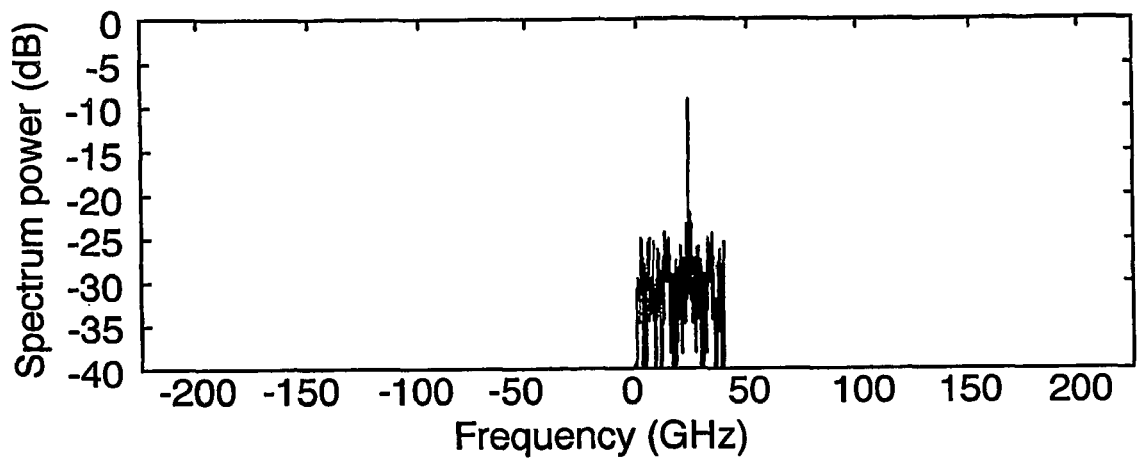
Figure 3D:
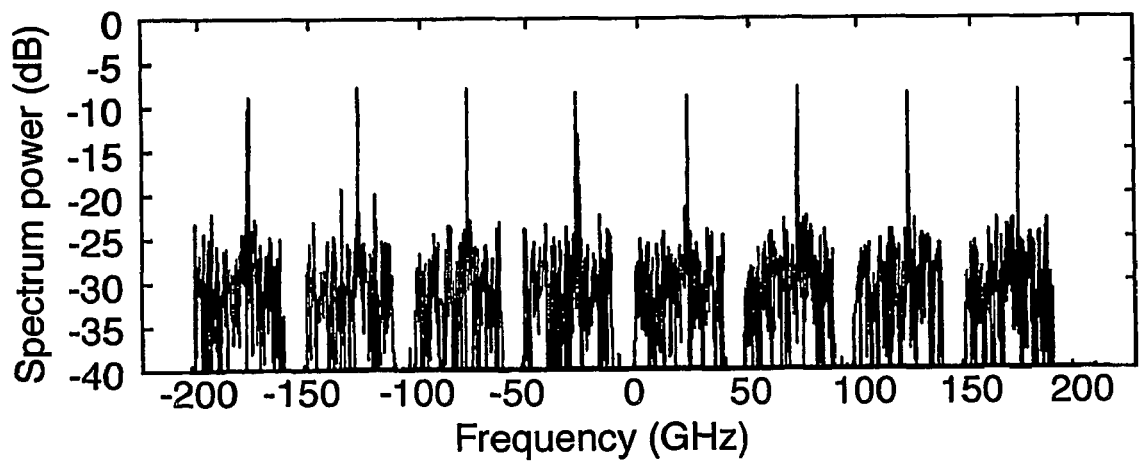

FIG. 3c shows the carrier spectrum of the pulse after filtering with the filter shown in FIG. 2. The pulse has a spectral profile extending over only 40 GHz with a sharp decay at each end. FIG. 3d shows how a series of channels with this spectral profile can be used in a WDM scheme. Each channel uses filtered pulses with a spectral width of 40 GHz and each channel is spaced from adjacent channels by 50 GHz, giving a 10 GHz spacing between the edges of adjacent channels.

Figure 4A:
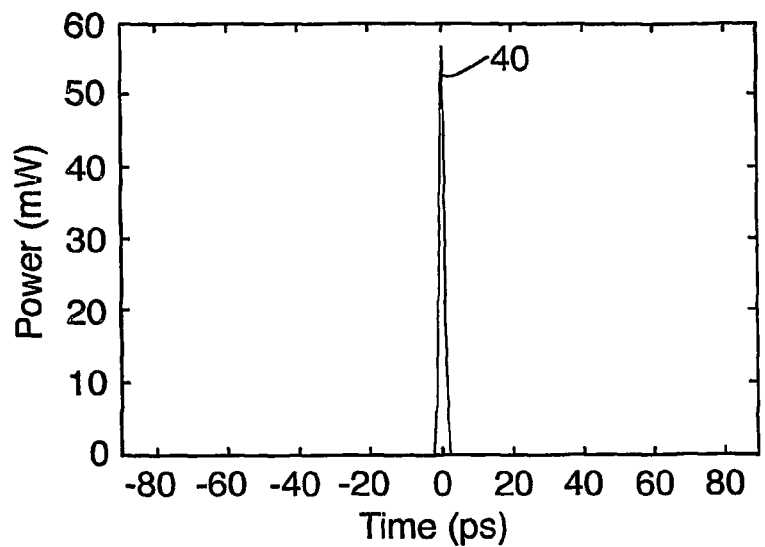
FIG. 4 illustrates the temporal profile of a signal generated in accordance with the present invention; and, FIG. 5 illustrates an alternative example of a transmitter in accordance with the present invention.
Figure 4B:
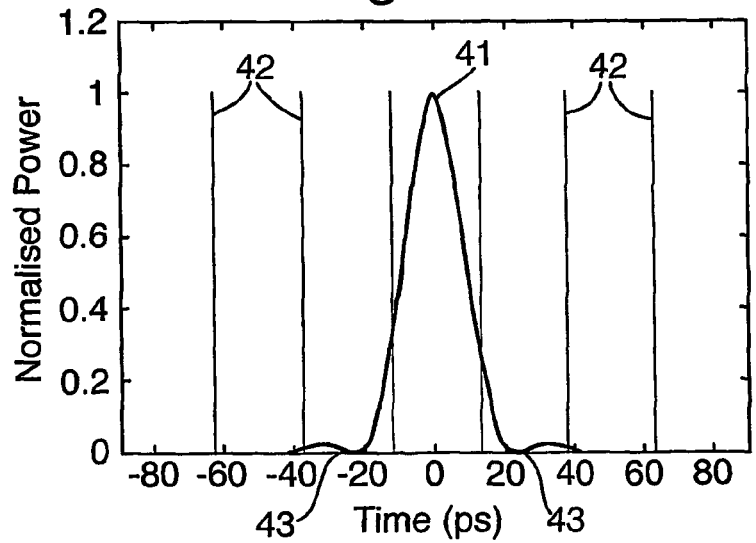

FIG. 4 shows the temporal profile of a pulse before and after filtering. FIG. 4a shows the pulse 40 prior to filtering. FIG. 4b shows the temporal profile of the pulse 41 after filtering. The vertical lines 42 in FIG. 4b also show when each time slot begins and ends relative to the pulse shown. The pulses are produced at 40 GHz in this example and so each time slot lasts 25 ps. It can be clearly seen that the filtered pulse extends over several time slots and that the minima 43 of the filtered pulse fall in the centre of the time slots adjacent to the time slot the pulse is centred on. This ensures that the effect of the overlap on neighbouring bits or pulses is minimised.

The ideal filter profile shown in FIG. 3b gives rise to a sinc shaped temporal profile for the carrier pulses having minima in adjacent time slots. If the bandwidth of the filtered pulses is B then the temporal profile is of the form sinc (TrBt). However, it is not necessary to produce pulses with a completely flat top spectral profile to get the benefit of the present invention, only something approximating to it, such as a super-Gaussian filter described above, which gives rise to a carrier extending over more than one time slot but which has local minima which can be positioned in the centre of time slots adjacent to the time slot the pulse is centred on.

The transmitter shown in FIG. 2 can be used to produce optical data for transmission over a single channel in a WDM system. A plurality of transmitters might be used in a WDM transmitter, one for each channel, with the data streams subsequently multiplexed. The data pulses can be directly detected at the receiver end 25 using standard filters.

The error-free transmission distance of the data pulses of the present invention is a function of the filter detuning i.e. the asymmetric filter offset. Ideally, the initial pulses are not filtered symmetrically about their central frequency. The optimal detuning is sensitive to the optical filter shape. For instance, using super-Gaussian filter of the sixth order it can be found that the optimal detuning is shifted to −6 GHz. Accordingly, the system shown in FIG. 2 includes a control loop 24 and a variable pass band filter. The bit error rate (BER) is monitored at the receiver end 25 by the control and the filter detuning optimised to minimised the BER.

Figure 5:
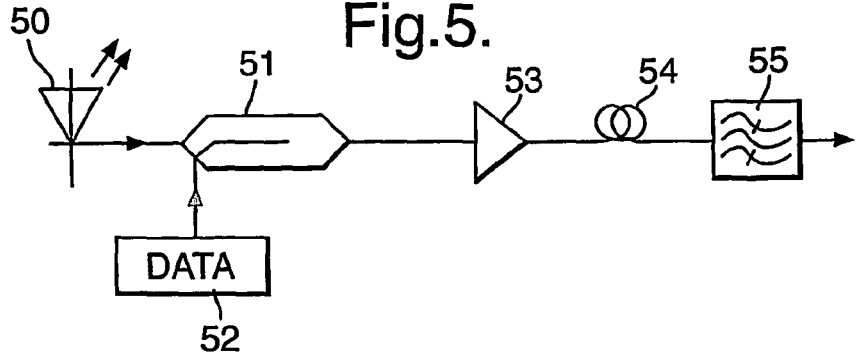

FIG. 5 shows an alternative transmitter design in accordance with the present invention. A coherent light source 50 provides an optical beam. The beam is modulated using an MZ modulator 51 driven with RZ electrical data 51 at the required bit rate. The data pulses are then amplified by amplifier 53 and passed through a length of nonlinear highly dispersive fibre 54 in order to compress the pulses. The compressed, i.e. narrowed pulses are then filtered using a super-Gaussian type filter 55 as in the transmitter of FIG. 2. The control loop for the filter detuning is not shown but is equally applicable to this transmitter as it is to the transmitter of FIG. 2.

It should be noted that the system shown in FIG. 1 might be suitable for producing narrow pulses which could be subsequently filtered in accordance with the present invention. In order to produce the required narrow pulses the modulator 11 would have to be able to switch on and off very quickly. Suitable modulators may be available in the near future.

The present invention provides a data format that is tolerant to overlap between neighbouring bits, allowing greater spectral efficiency in a WDM transmission scheme. The fact that each data pulse extends across more than one time slot does not destroy the data. The pulse shape can be chosen for a particular application such that the effect of the overlap is tolerable, whilst maximising spectral efficiency.

The invention claimed is:

1. A method of optically encoding data for transmission over a wavelength division multiplexed optical communications system comprising the steps of:
   generating a periodic series of optical pulses defining a series of time slots, wherein one pulse appears in each time slot;
   filtering the pulses by way of a filter to produce carrier pulses extending over more than one time slot; and
   modulating the pulses with data for transmission; wherein
   for each of at least some of the carrier pulses, the filter gives rise to the corresponding carrier pulse having a temporal profile with a minimum substantially in the center of each of the time slots adjacent to the time slot for that corresponding carrier pulse, the temporal profile of the corresponding carrier pulse further having an oscillating tail that extends from the minimum into at least one time slot that is even further from the time slot for the corresponding carrier pulse.

2. A method according to claim 1, wherein the filtered carrier pulses each have a substantially flat top spectral profile.

3. A method according to claim 1, wherein the step of modulating the pulses with data is performed before the filtering step.

4. A method according to claim 1, wherein the filter is detuned to optimize transmission performance.

5. A method according to claim 1, wherein the filter is a super-Gaussian $6^{th}$ order bandpass filter.

6. A method according to claim 1, wherein modulating the pulses with data for transmission is performed by a Mach Zehnder modulator.

7. A method according to claim 1, wherein a first portion of the oscillating tail rises as it extends from the minimum to a local maximum and a second portion of the oscillating tail falls from the local maxima as it crosses into the time slots adjacent to the time slots having the minimum.

8. A transmitter for producing an optical data signal for transmission over a wavelength division multiplexer optical communication system comprising:
   means for producing a periodic series of optical pulses defining a series of time slots, wherein one pulse appears in each time slot;
   a filter having a spectral profile giving rise to carrier pulses, each carrier pulse having a temporal profile extending over more than one time slot, the temporal profile having a minimum substantially in the center of each of the time slots adjacent to the time slot for that corresponding carrier pulse, the temporal profile of the corresponding carrier pulse further having an oscillating tail that extends from the minimum into at least one time slot that is even further from the time slot for the corresponding cg pulse; and
   modulating means for modulating the pulses with data for transmission.

9. A transmitter according to claim 8, wherein the filter has a substantially flat top spectral profile.

10. A transmitter according to claim 8, wherein the modulating means is placed in the transmitter before the filter in a signal path of the transmitter.

11. A transmitter according to claim 10, wherein an amplifier is placed between the modulating means and the filter in the signal path of the transmitter.

12. A transmitter according to claim 8, wherein the modulating means a Mach Zehnder modulator.

13. A transmitter according to claim 8, wherein the filter is a super-Gaussian $6^{th}$ order bandpass filter.

14. A transmitter according to claim 8, wherein a first portion of the oscillating tail rises as it extends from the minimum and a second portion of the oscillating tail falls in relation to the first portion as it crosses into the time slots adjacent to the time slots having the minimum.

15. A transmitter for producing an optical data signal for transmission over a wavelength division multiplexer optical communication system comprising:
   means for producing a periodic series of optical pulses defining a series of time slots, wherein one pulse appears in each time slot;
   a filter having a spectral profile giving rise to carrier pulses, each carrier pulse having a substantially Sinc shaped temporal profile extending over more than one time slot, the substantially Sinc shaped temporal profile having a minimum substantially in the center of each of the time slots adjacent to the time slot for that corresponding carrier pulse; and
   modulating means for modulating the pulses with data for transmission.

16. A transmitter according to claim 15, wherein the substantially Sinc shaped temporal profile also has an oscillating tail that extends from the minimum to each of the time slots adjacent to the time slots having the minimum that are not the time slot for the corresponding carrier pulse.

17. A transmitter according to claim 16, wherein a first portion of the oscillating tail rises as it extends from the minimum to a local maximum and a second portion of the oscillating tail falls from the local maxima as it crosses into the time slots adjacent to the time slots having the minimum.

18. A transmitter according to claim 15, wherein the filter is detuned to optimize transmission performance.

19. A transmitter according to claim 15, wherein the modulating means a Mach Zehnder modulator.

20. A transmitter according to claim 15, wherein the filter is a super-Gaussian $6^{th}$ order bandpass filter.

* * * * *